United States Patent
Joshi et al.

(10) Patent No.: US 10,839,138 B1
(45) Date of Patent: *Nov. 17, 2020

(54) PROVIDING FONTS FOR ELECTRONIC PUBLICATIONS

(71) Applicant: AMAZON TECHNOLOGIES, INC., Seattle, WA (US)

(72) Inventors: Lokesh Joshi, Seattle, WA (US); Michael Patrick Bacus, Seattle, WA (US); Christopher Allen Suver, Seattle, WA (US); Eric Allen Menninga, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 820 days.

This patent is subject to a terminal disclaimer.

(21) Appl. No.: 15/282,197

(22) Filed: Sep. 30, 2016

Related U.S. Application Data

(63) Continuation of application No. 13/894,319, filed on May 14, 2013, now Pat. No. 9,483,445.

(51) Int. Cl.
　　*G06Q 30/02*　　(2012.01)
　　*G06F 40/109*　(2020.01)
　　*G06F 3/0482*　(2013.01)
　　*G06F 3/0483*　(2013.01)
　　*G06Q 20/12*　　(2012.01)

(52) U.S. Cl.
　　CPC .......... *G06F 40/109* (2020.01); *G06F 3/0482* (2013.01); *G06F 3/0483* (2013.01); *G06Q 20/123* (2013.01); *G06Q 30/0283* (2013.01)

(58) Field of Classification Search
　　CPC .... G06Q 10/00; G06Q 30/02; G06Q 30/0283; G06F 40/103; G06F 40/106; G06F 40/109; G06F 40/114
　　USPC ................................................ 705/7.11–7.42
　　See application file for complete search history.

(56) References Cited

U.S. PATENT DOCUMENTS

| | | | | |
|---|---|---|---|---|
| 6,853,980 | B1 * | 2/2005 | Ying | G06Q 30/06 705/26.62 |
| 7,539,939 | B1 * | 5/2009 | Schomer | G06F 17/214 715/269 |
| 8,413,051 | B2 * | 4/2013 | Bacus | G06F 17/00 715/205 |
| 8,555,162 | B2 * | 10/2013 | Bacus | G06F 17/214 715/234 |
| 2005/0193336 | A1 * | 9/2005 | Fux | G06F 40/109 715/269 |

(Continued)

OTHER PUBLICATIONS

Rafie et al., An e-book Personalization Architechture With Digital Rights and Encryption Procedures, 2010 International Symposium on Information Technology (vol. 3, pp. 1222-1227 (Year: 2010).*

*Primary Examiner* — Robert D Rines
(74) *Attorney, Agent, or Firm* — Lowenstein Sandler LLP

(57) ABSTRACT

A method and system to provide fonts for electronic publications is described. An example method includes receiving a request for an electronic publication from a user device, retrieving a font identifier of a font from the electronic publication, providing the electronic publication to the user device, determining, based on the font identifier, that at least one font file of the font is not stored on the user device, and providing the at least one font file of the font to the user device.

15 Claims, 9 Drawing Sheets

(56) References Cited

U.S. PATENT DOCUMENTS

| | | | |
|---|---|---|---|
| 2011/0126191 A1* | 5/2011 | Hughes | G06F 8/61 |
| | | | 717/178 |
| 2012/0066590 A1* | 3/2012 | Harris | G06F 17/214 |
| | | | 715/269 |
| 2013/0007603 A1* | 1/2013 | Dougherty | G06T 11/60 |
| | | | 715/251 |

* cited by examiner

PROVIDING FONTS FOR ELECTRONIC PUBLICATIONS

CROSS-REFERENCE TO RELATED APPLICATION

This application is a continuation of U.S. patent application Ser. No. 13/894,319 filed on May 14, 2013, titled "Providing Fonts for Electronic Publications," the entirety of which is hereby incorporated herein by reference.

BACKGROUND

A large and growing population of users employs various electronic devices to read digital content such as articles, journals, magazines, electronic books (e-books), news feeds and blog feeds. Among these electronic devices are e-book readers (also known as e-readers), cellular telephones, personal digital assistants (PDAs), portable media players, tablet computers, netbooks, and the like.

An e-book is typically downloaded to an electronic device with a set of embedded font files that allow an e-book publisher to provide a desired stylistic on-screen reading experience. As e-readers and other electronic devices continue to proliferate, finding inexpensive and effective ways to provide fonts for e-books continues to be a priority.

BRIEF DESCRIPTION OF THE DRAWINGS

Embodiments of the present disclosure will be understood more fully from the detailed description given below and from the accompanying drawings of various embodiments of the present invention, which, however, should not be taken to limit the present invention to the specific embodiments, but are for explanation and understanding only.

DETAILED DESCRIPTION

The present disclosure is directed to providing fonts for electronic book (e-book) content. E-book publishers typically license rights to embed fonts into e-books. The process of finding an appropriate font can be cumbersome as an e-book publisher may need to identify reputable font foundries, and contact them individually to get familiar with their fonts, as well as their licensing requirements and terms. In addition, font foundries typically charge an annual license fee or a license fee per title and do not take into account revenues generated from the sale of e-books. Furthermore, embedded fonts can be relatively large in size. For example, embedded fonts for Japanese text or Chines text can be between 15 and 30 megabytes in size and can constitute a substantial portion of the e-book download. If an e-book is downloaded without fonts, a user device can potentially use system fonts for rendering the e-book content. System fonts are pre-installed fonts that are used by an operating system of a user device to render text in user interfaces displayed on the user device. However, publishers often want to create a rich stylistic reading experience (e.g., to match the print version) that cannot be achieved via system fonts.

Embodiments of the present disclosure address the above deficiencies of existing solutions by providing a font service that posts authorized fonts from various sources and tracks usage of fonts selected by publishers for individual e-books to enable royalty-based license fees for the usage of fonts. In addition, embodiments of the present disclosure separate publishers' fonts from e-book content to allow a user device to share publishers' fonts across different e-books. For example, a publisher may want to use the same fonts for all the e-books in a certain book series to ensure that they all have a uniform stylistic look. With embodiments of the present disclosure, the fonts in the above example can be downloaded to the user device only once and then shared among all the books in the book series.

It should be noted that the term "e-book" is used herein only for illustration, and that embodiments of the present disclosure are similarly applicable to various other electronic publications including, for example, newspaper articles, journal articles, magazine articles, and the like. Similarly, the term "publisher" is also used herein only for illustration, and can encompass an e-book designer, an e-book author or any other entity that is involved in the design of an e-book and/or the creation of e-book content.

Figure 1:
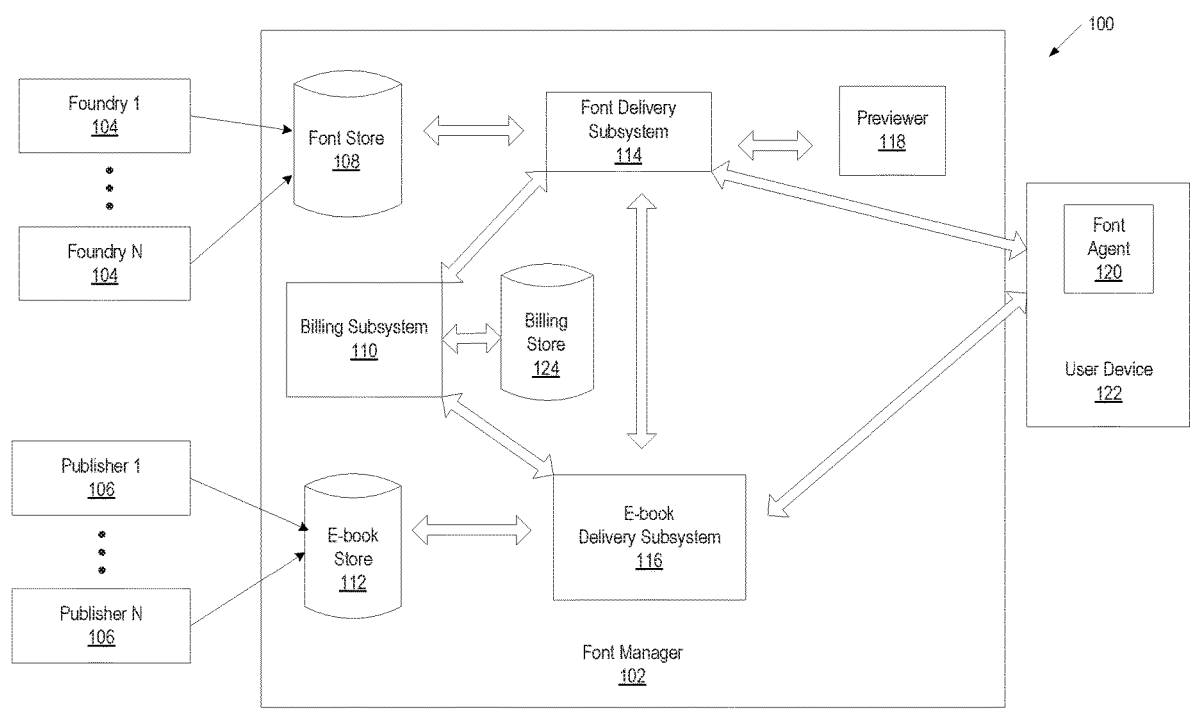
FIG. 1 illustrates an example system for providing fonts for e-book content, in accordance with some embodiments of the present disclosure.

FIG. 1 illustrates an example system 100 for providing fonts for e-book content, in accordance with some embodiments of the present disclosure. System 100 includes a font manager 102 that receives electronic publications from various content sources such as publishers 106, converts the received electronic publications into a format readable by user devices 122 as part of an ingestion phase, and stores the converted electronic publications in an e-book store 112. In addition, the font manager 102 receives fonts (e.g., Arial, Palatino, Calibri, etc.) in any of the approved formats (e.g., TrueType, OpenType, etc.) from authorized font sources such as foundries 104. Each font may have a set of font files that may be validated (e.g., confirmed that it comes from a reliable source) and digitally signed (e.g., using a key of the font manager 102). The font manager 102 may store the received fonts in font store 108. In addition, the font manager 102 may maintain internal fonts and store them in the font store 108 as well. Each font may have metadata (e.g., information embedded in each font file) that includes an identifier (ID) of a font source (e.g., a foundry ID), pricing options (e.g., a fee per e-book download, a fee per user device, a fee per user, a flat fee per title, an annual license fee, etc.), supported character encodings, supported font features (e.g., underline, bold, italic, subscript, superscript, strikethrough, etc.), and the like. The font manager 102 can also allocate a unique ID to each font, which can be a unique randomly generated number, or a string including a font source ID, a font face (e.g., Arial, Palatino, Calibri, etc.), a font version ID, etc. The font store 108 can store a set of font files of each font with a unique font ID. For example, the set of font files can be grouped as a library of files, and the font ID and the font metadata can be stored in one of the library files.

The font manager 102 can include font delivery subsystem 114 that allows publishers 106 to view the available fonts and to select certain fonts for individual e-books. The font delivery subsystem 114 can provide a user interface presenting available fonts with attributes derived from font metadata (e.g., foundry ID, pricing options, supported character encodings, and supported font features). In addition, the font manager 118 may include a previewer 118 that generates a preview of e-book content rendered on a simulated user device using the selected font. A simulated user device can be represented by a virtual machine running on a platform similar to that of the user device and executing software (e.g., operating system, rendering engine) similar to that of the user device. A publisher 106 can select a font for a specific e-book and can preview the e-book content (e.g., a subsection of the content) rendered using the selected font. Based on the preview, the publisher 106 can approve or reject the selected font. Upon approval, the font delivery subsystem 114 can provide the font ID and the e-book ID to an e-book delivery subsystem 116 which can add the font ID to the e-book in the e-book store 112. In one embodiment, the font ID is encrypted (e.g., using the key of the font manager 116) before it is added to the e-book.

When user device 122 sends a request for an e-book to the font manager 102, the e-book delivery subsystem 166 finds the e-book in the e-book store 112, retrieves font ID from the e-book, downloads the e-book to the user device 122, and provides the font ID to the font delivery subsystem 114. The font delivery subsystem 114 can maintain information on fonts currently stored by the user device 122 (e.g., by periodically requesting this information from font agent 120) and can determine, based on the font ID, whether the corresponding font files are stored on the user device 122. If not, the font delivery subsystem 114 can download the corresponding font files from the font store 108 to the user device 122. If so, the font delivery subsystem 114 does not perform the download.

Alternatively, the e-book delivery subsystem 116 does not provide the font ID to the font delivery subsystem 114. Rather, when the user of the user device 122 opens the e-book, the font agent 120 retrieves the font ID from the e-book, and sends a request for the corresponding font files to the font delivery subsystem 114 if those font files are not stored locally on the user device 122. Upon receiving a request with the font ID from the font agent 120, the font delivery subsystem 114 downloads the corresponding font files from the font store 108 to the user device 122.

The font manager 102 may also include a billing subsystem 110 that receives information pertaining to different fonts from the font delivery subsystem 114 and the e-book delivery subsystem, and stores this information in a billing store 124. For example, the billing subsystem 110 can initially receive and store a foundry ID of foundry 104, font IDs of fonts provided by the foundry 104, payment options offered by foundry 104 for each font, and character encodings and features supported by each font. When a publisher 106 selects one of these fonts for its e-book, the billing subsystem 110 can receive the e-book ID and the font ID from the font delivery subsystem 114 and can create a record for the font ID and the e-book ID in the billing store 124. Subsequently, when the e-book delivery subsystem 116 downloads the e-book to the user device 122, the e-book delivery subsystem 116 can provide the user device ID, the user ID and the time of e-book download to the billing subsystem 110, which may add this information to the font record in the billing store 124. The billing subsystem 110 may also add the time of font download to the billing store 124 if such a download took place.

Periodically (e.g. once a month), the billing subsystem 110 can process the information stored in the billing store 124 and calculate a payment by each publisher 106 to a respective foundry 104. For example, the payment can be calculated based on the number of e-book downloads (e.g., using a fee per e-book download and the number of e-book downloads, or using a percentage of e-book revenue and the number of e-book downloads). In another example, the payment can be calculated based on the number of e-book downloads to distinct user devices (e.g., to account for a situation in which an e-book is downloaded to the same user device multiple times for a single fee). In yet another example, the payment can be calculated based on the number of e-book downloads to distinct users (e.g., to account for a situation in which an e-book is downloaded to different devices of the same user for a single fee). In still another example, the payment can be calculated based on the number of font downloads to distinct user devices or distinct users or based on the overall number of downloads (e.g., to account for a situation in which a set of font files is downloaded once for a fee but then shared across multiple e-books for free).

Figure 2:
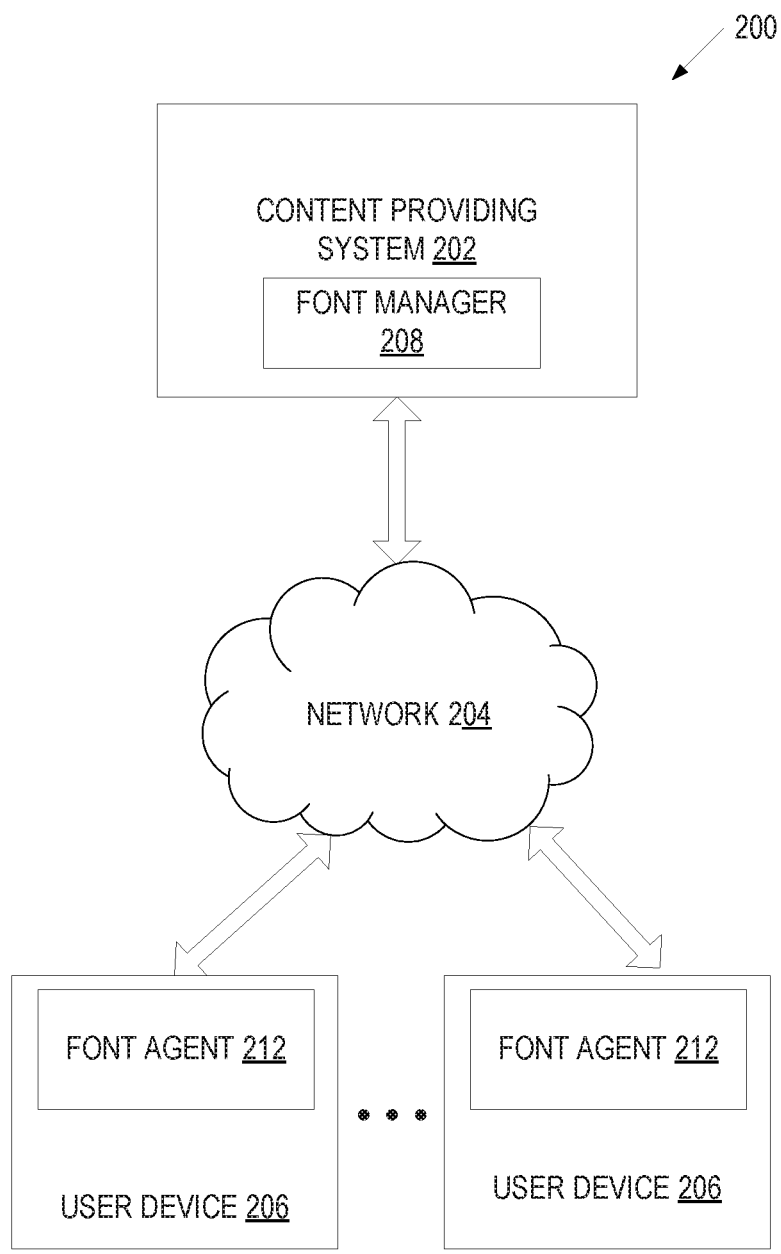
FIG. 2 is a block diagram of an exemplary network architecture in which embodiments of the present disclosure may operate.

FIG. 2 is a block diagram of an exemplary network architecture 200 in which embodiments of the present disclosure may operate. The network architecture 200 may include a content providing system 202 and multiple user devices 206 coupled to the content providing system 202 via a network 204 (e.g., a public network such as the Internet, a private network such as a local area network (LAN), or a virtual private network (VPN)).

The user devices 206 are variously configured with different functionality to enable consumption of electronic publications such as e-books, newspaper articles, journal articles, magazine articles, and the like. The user devices 206 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The content providing system 202 provides electronic publications, upgrades, and/or other information to the user devices 206 registered with the content providing system 202 via the network 204. The content providing system 202 also receives various requests, instructions and other data from the user devices 206 via the network 204. The content providing system 202 may include one or more machines (e.g., one or more server computer systems, routers, gateways) that have processing and storage capabilities to provide the above functionality.

Communication between the content providing system 202 and a user device 206 may be enabled via any communication infrastructure. One example of such an infrastructure includes a combination of a wide area network (WAN) or a VPN and wireless infrastructure, which allows a user to use the user device 206 to purchase items and consume items without being tethered to the content providing system 202 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 206. Yet alternatively, or in combination, the wireless infrastructure may be provided by an access point (e.g., WiFi access point) provider system.

The content providing system 202 can be part of a cloud (e.g., a public cloud, a private cloud or a hybrid cloud) maintained by a cloud provider. The content providing system 202 can include a font manager 208 that receives fonts from different font sources (e.g. font foundries) and presents the received fonts (and optionally fonts created or maintained internally) to various entities associated with the electronic publications. An entity may be a publisher of an electronic publication, a designer of an electronic publication, an author of an electronic publication or any other entity involved in the design of an electronic publication or in the creation of electronic publication content. The font manager 208 allows an entity to select a font for a specific electronic publication, and associates the electronic publication with the selected font via a font ID of the selected font. The font manager 208 stores the font separately from the respective electronic publication, facilitating separate downloads of the font and the respective electronic publication. The font manager 208 also provides a royalty based payment model to license fonts for electronic publications.

Each user device 206 may include a font agent 212 that receives fonts separately from electronic publications, and links each electronic publication with a respective font using a font ID included in the electronic publication. The font agent 212 may also receive a font for one electronic publication and then use the same font for other subsequently received publications.

Figures 3, 4:
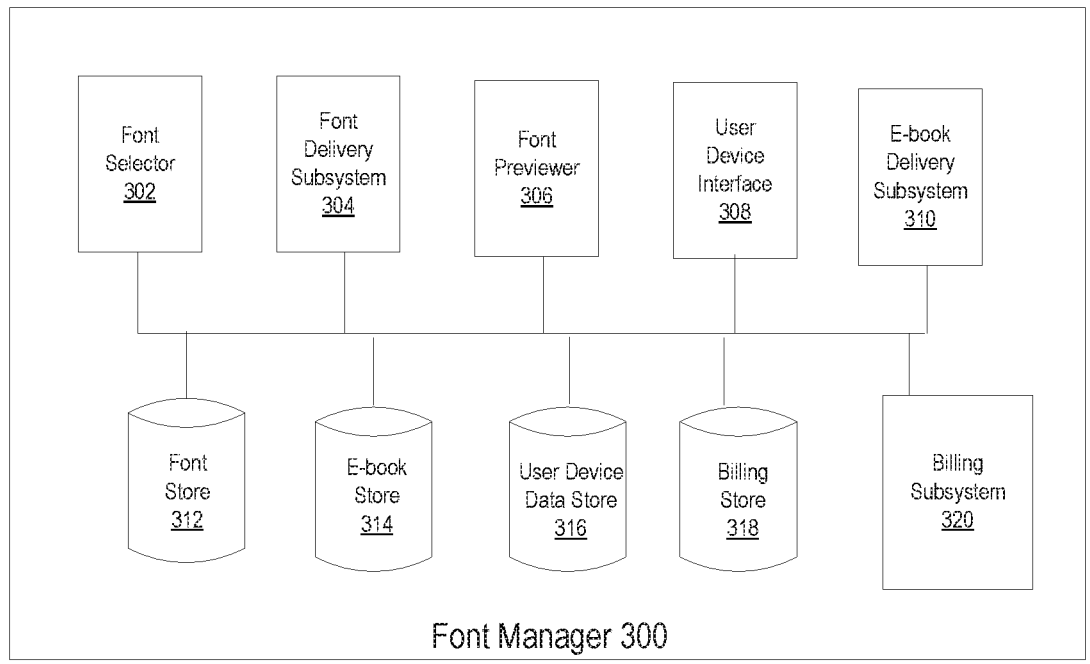
FIG. 3 is a block diagram of one embodiment of a font manager.
FIG. 4 is a block diagram of one embodiment of a sample record in a billing store in accordance with some embodiments of the present disclosure.

FIG. 3 is a block diagram of one embodiment of a font manager 300. The font manager 300 may be the same as the font manager 208 of FIG. 2. In one embodiment, the font manager 300 includes a font selector 302, a font delivery subsystem 304, a font previewer 306, a user device interface 308, an e-book delivery subsystem 310, a billing subsystem 320, a font store 312, an e-book store 314, a user device data store 316, and a billing store 318. The components of the font manager 300 may represent modules that can be combined together or separated into further modules, according to some embodiments.

The font store 312 includes fonts provided by multiple font sources (e.g., font foundries). Each font may have a set (or a library) of font files that may be validated and digitally signed. Each font may have metadata that includes an identifier (ID) of a font source (e.g., a foundry ID), pricing options (e.g., a fee per e-book download, a fee per user device, a fee per user, a flat fee per title, an annual license fee, etc.), supported character encodings, supported font features (e.g., underline, bold, italic, subscript, superscript, strikethrough, etc.), and the like. The metadata may be provided as a separate file included in the set or library of font files of the font. Each font file in the set can also include a unique ID of the font, which can be a unique randomly generated number, or a string including a font source ID, a font face (e.g., Arial, Palatino, Calibri, etc.), a font version ID, etc.

The e-book store 314 includes e-book content (e-books) received from multiple sources (e.g., publishers, designers, authors, etc.) and converted into a format understandable by user devices. The user device data store 316 may include font-related characteristics of user devices (e.g., electrophoretic ink (eInk) user devices or Android-based user devices) and rendering engines (software and/or hardware converting specifications for images into pixels) supported by user devices. These characteristics may include, for example, supported fonts, performance parameters (e.g., speed, expected quality, etc.) associated with individual font types, resource requirements (e.g., processor usage, memory consumption, etc.) associated with individual font types, etc. The user device data store 316 may also include font IDs of fonts currently stored on individual user devices and e-book IDs of e-books currently stored on individual user devices.

The billing store 318 may include information related to fonts and the usage of fonts by individual user devices. The fonts store 312, the e-book store 314, the user device data store 316 and the billing store 318 may represent a single data structure or multiple data structures (databases, repositories, files, etc.) residing on one or more mass storage devices, such as magnetic or optical storage based disks, solid-state drives (SSDs) or hard drives.

The font selector 302 allows publishers and other similar entities to view the available fonts and to select certain fonts for individual e-books. The font selector 302 can provide a user interface presenting available fonts with attributes derived from font metadata (e.g., foundry ID, pricing options, supported character encodings, and supported font features) to help the publisher with font selection. The available fonts may also include default fonts offered to publishers for free. The user interface provided by the font selector 302 may include an indicator showing that a certain font is offered for free. The font previewer 306 can generate a preview of e-book content rendered on a simulated user device using the selected font. The publisher can specify the type and/or characteristics (e.g., rendering engine, OS, performance characteristics, etc.) of a user device that should be simulated. Based on the preview, the publisher can approve or reject the selected font. Upon approval, the font delivery subsystem 304 can provide the font ID and the e-book ID to e-book delivery subsystem 310 which can add the font ID to the e-book in the e-book store 314. In one embodiment, the font ID is encrypted before it is added to the e-book in the e-book store 314.

In one embodiment, the publisher can subscribe to upgrades of a font. In such a case, when the font delivery subsystem 304 receives an upgraded version of the font, the font delivery subsystem 304 identifies the publisher's e-books linked to a previous version of the font and instructs the e-book delivery subsystem 310 to replace, in each identified e-book, the font ID of the previous version with the font ID of the upgraded version.

The user device interface 308 can periodically (e.g., when the user device connects to the content providing system 202) communicate with the user device to receive font IDs of fonts currently stored on the user device and/or e-book IDs of e-books currently stored on the user device. In one embodiment, the user device interface 308 can determine what fonts do not have a matching e-book based on fonts IDs and can instruct the user device to remove unmatched fonts form the user device (e.g., to save storage space on the user device).

The e-book delivery subsystem 310 receives a request for an e-book from a user device, finds the e-book in the e-book store 314, retrieves font ID from the e-book, downloads the e-book to the user device, and provides the font ID to the font delivery subsystem 304. The font delivery subsystem 304 can compare the font ID with font IDs of fonts stored on the user device (as recorded in the user device data store 316) and determine whether the font ID belongs to the font currently stored on the user device. If so, the font delivery subsystem 304 can download the corresponding font files from the font store 312 to the user device. In one embodiment, the font delivery subsystem 304 encrypts the font files (e.g., using a public key of the user) prior to sending them to the user device. If the font files are already stored on the user device, the font delivery subsystem 304 does not send the font files to the user device.

Alternatively, when the user of the user device opens the e-book downloaded by the e-book delivery subsystem 310, the user device can retrieve the font ID from the e-book, and send a request for the corresponding font files to the font delivery subsystem 304 if those font files are not stored locally on the user device. Upon receiving a request with the font ID from the user device, the font delivery subsystem 304 optionally encrypts the font files and sends the font files to the user device.

Billing subsystem 320 receives information pertaining to different fonts from the font delivery subsystem 304 and the e-book delivery subsystem 310, and stores this information in billing store 318. FIG. 4 illustrates an example record 400 of the billing store 318, according to some embodiments. Record 400 may include a foundry ID 402 of a foundry, a font ID 406 of a font provided by the foundry, font pricing options 408 offered by the foundry 402 for font 406, an e-book ID 410 associated with the font 406, a publisher ID 412 of a publisher of e-book 410. Record 400 may also include a device ID 414 of a user device to which e-book 410 was downloaded, a user ID 416 of a user of the user device 414, time 418 when e-book 410 was downloaded to user device 414, and time 420 when font files of font 406 were downloaded to user device 416 for e-book 410. Record 400 may also include other information (e.g., version ID of the font 406, etc.).

Referring back to FIG. 3, the billing subsystem 320 can periodically process the information stored in the billing store 318 and calculate a payment by each publisher to a respective foundry. For example, the payment can be calculated based on the number of e-book downloads (e.g., using a fee per e-book download and the number of e-book downloads, or using a percentage of e-book revenue and the number of e-book downloads). In another example, the payment can be calculated based on the number of e-book downloads to distinct user devices (e.g., to account for a situation in which an e-book is downloaded to the same user device multiple times for a single fee). In yet another example, the payment can be calculated based on the number of e-book downloads to distinct users (e.g., to account for a situation in which an e-book is downloaded to different devices of the same user for a single fee). In still another example, the payment can be calculated based on the number of font downloads to distinct user devices or distinct users, or based on the overall number of fonts downloads (e.g., to account for a situation in which a set of font files is downloaded once for a fee and then shared across multiple e-books for free).

Figure 5:
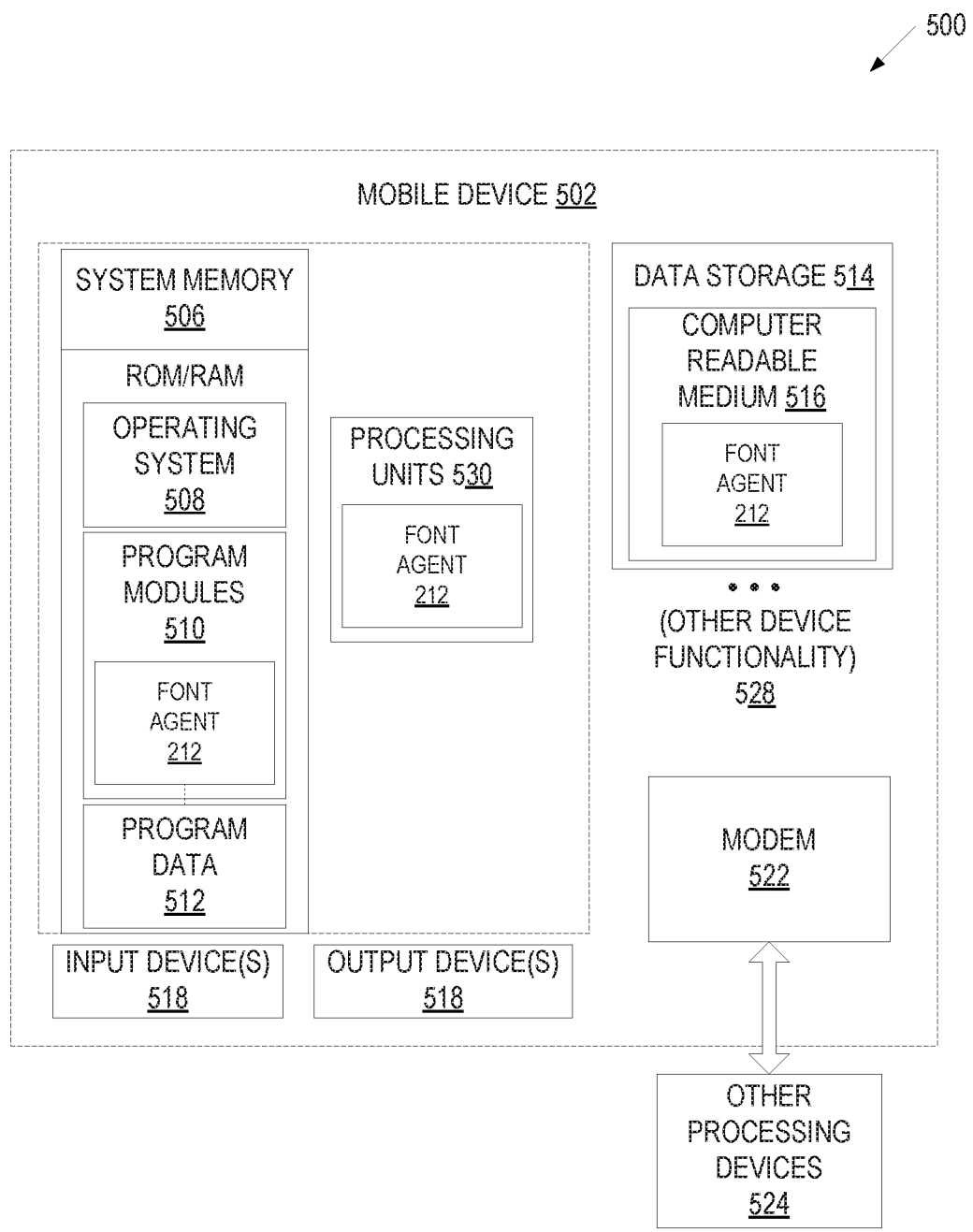
FIG. 5 is a block diagram of an example electronic device supporting separate downloads of e-book content and fonts.

FIG. 5 is a block diagram of an example user device 500 supporting separate downloads of e-book content and fonts. The user device 500 may be the same as user device 206 of FIG. 2 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 500 includes one or more processing units 504, such as one or more CPUs or processor cores. The user device 500 also includes system memory 506, which may correspond to any combination of volatile and/or non-volatile storage mechanisms. The system memory 506 may store information which provides an operating system component 508, various program modules 510 including font agent 212, program data 512, and/or other components. The user device 500 performs functions by using the processing unit(s) 504 to execute the font agent 212 and other instructions provided by the system memory 506.

The user device 500 may also include a data storage device 514 that may consist of one or more types of removable storage and/or one or more types of non-removal storage. The data storage device 514 may include a computer-readable medium 516 on which is stored one or more sets of instructions such as instructions of the font agent 212 embodying any one or more of the methodologies or functions described herein. As shown, instructions of the font agent 212 may also reside, completely or at least partially, within the system memory 506 and/or within the processing unit(s) 530 during execution thereof by the user device 500, the system memory 506 and the processing unit(s) 530 also constituting computer-readable media. The instructions of the font agent 212 may further be transmitted or received over a network.

The user device 500 may also include one or more input devices 518 (keyboard, mouse device, specialized selection keys, etc.) and one or more output devices 520 (displays, printers, audio output mechanisms, etc.). The user device 500 may further include one or more communication interface mechanisms 522. These communication interface mechanisms 522 allow the user device 500 to interact with other processing devices 524, such as remote computers, the content providing system 202, and so forth.

The above-enumerated list of modules is representative and is not exhaustive of the types of functions performed by the user device 500. As indicated by the label "Other Device Functionality" 528, the user device 500 may include additional functions.

Figure 6:
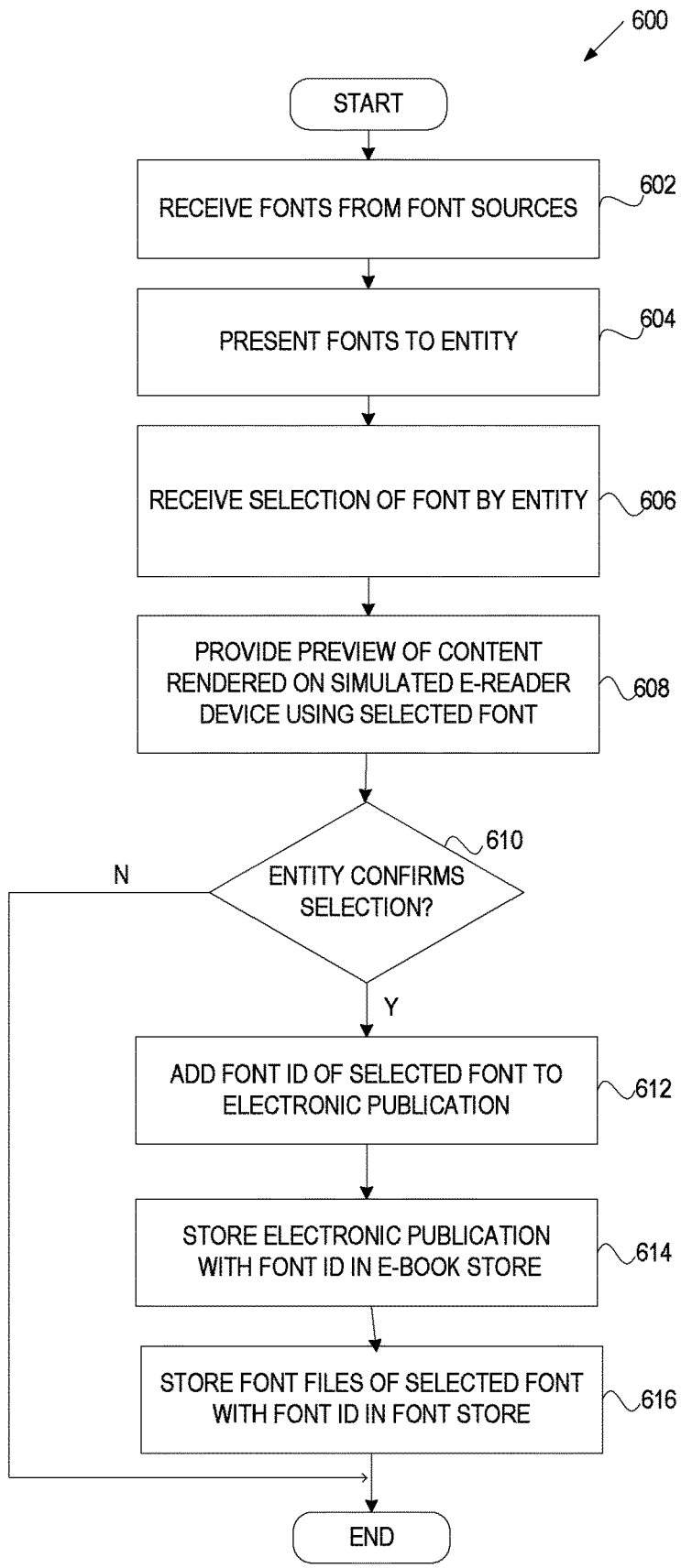
FIG. 6 is a flow diagram of one embodiment of a method for linking fonts to electronic publications.
Figure 7:
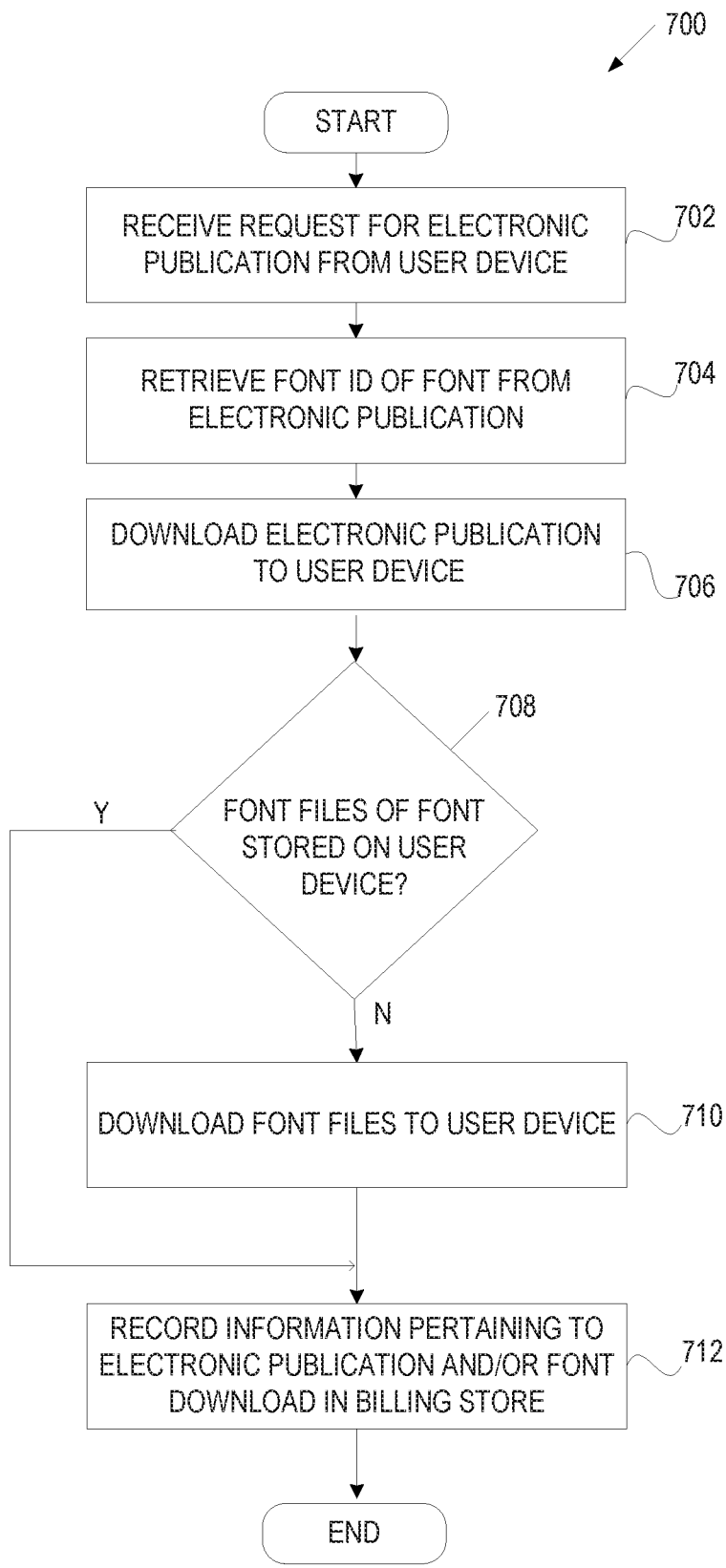
FIG. 7 is a flow diagram of one embodiment of a method for delivering font files for an electronic publication.
Figure 8:
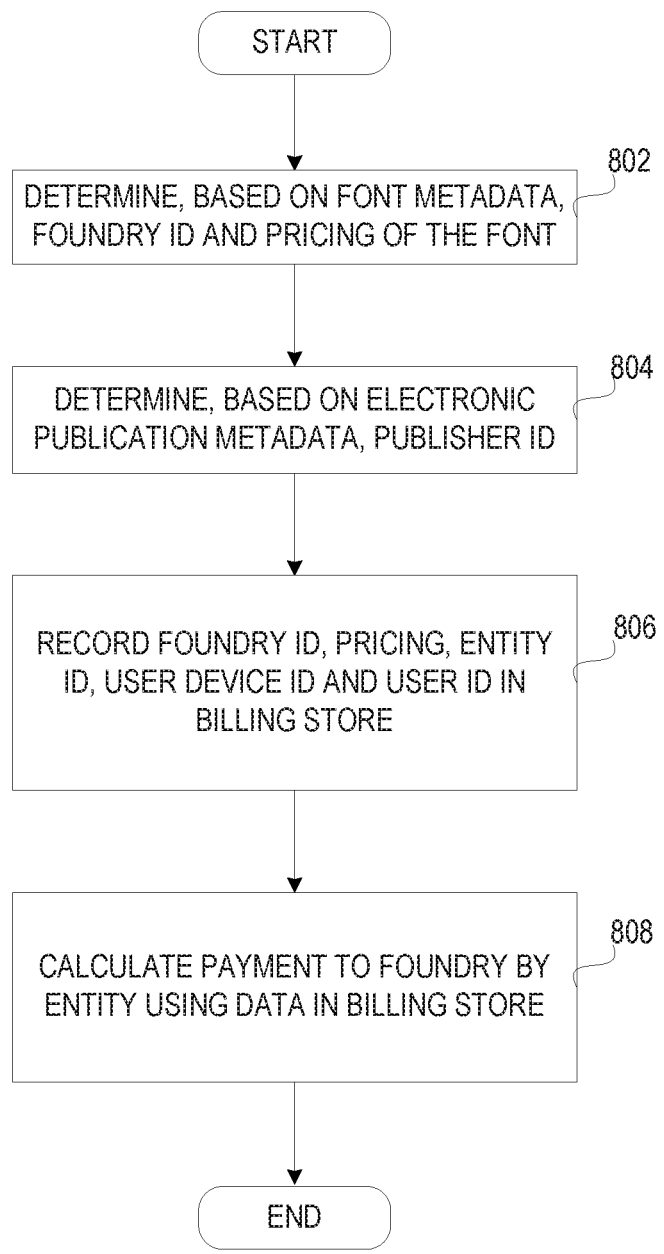
FIG. 8 is a flow diagram of one embodiment of a method for providing a revenue based model to license fonts for an electronic publication.

FIGS. 6, 7 and 8 are flow diagrams of some embodiments of server-side methods. The methods are performed by processing logic that may comprise hardware (circuitry, dedicated logic, etc.), software (such as is run on a general purpose computer system or a dedicated machine), or a combination of both. In one embodiment, the methods are performed by a server (e.g., font manager 208 of FIG. 2).

FIG. 6 is a flow diagram of one embodiment of a method 600 for linking fonts to electronic publications. Method 600 begins with the server receiving fonts from various font sources (e.g., font foundries, an internal system, etc.) (block 602). At block 604, the server presents the fonts to an entity associated with an electronic publication (e.g., a publisher or author of an e-book). At block 606, the server receives a selection of a font for the electronic publication by the entity.

At block 608, the server provides a preview of content of the electronic publication rendered on a simulated user device using the selected font. If the entity does not confirm the selection of the font after the preview (block 610), method 600 ends. If the entity confirms the selection of the font, the server adds a font ID of the selected font to the electronic publication (block 612), stores the electronic publication with the font ID in an e-book store (block 614), and stores font files of the selected font with the font ID in a font store (block 616).

FIG. 7 is a flow diagram of one embodiment of a method 700 for delivering font files for an electronic publication. Method 700 begins with the server receiving a request for an electronic publication from a user device (block 702). At block 704, the server accesses the electronic publication in an e-book store and retrieves a font ID from the electronic publication. At block 706, the server downloads the electronic publication to the user device.

At block 708, the server determines whether font files associated with the retrieved font ID are stored on the user device (e.g., using current font IDs periodically received form the user device). If so, the server downloads the font files to the user device (block 710), and records information pertaining to the download of the electronic publication and/or the download of the font files in a billing store (block 712).

FIG. 8 is a flow diagram of one embodiment of a method 800 for providing a revenue based model to license fonts for an electronic publication. Method 800 begins with the server identifying a font associated with an electronic publication requested by a user device. At block 802, the server accesses font metadata of the identified font and determines a foundry ID and pricing options of the font based on the font metadata. At block 804, the server determines an ID of a content source entity (e.g., a publisher, an author, etc.) of the electronic publication based on metadata associated with the electronic publication. At block 806, the server records the foundry ID of the font, the font pricing information, the ID of the content source entity, the ID of the user device, and the ID of a user of the user device in a billing store. At block 808, the server calculates a payment to the foundry by the content source entity using data in the billing store.

Figure 9:
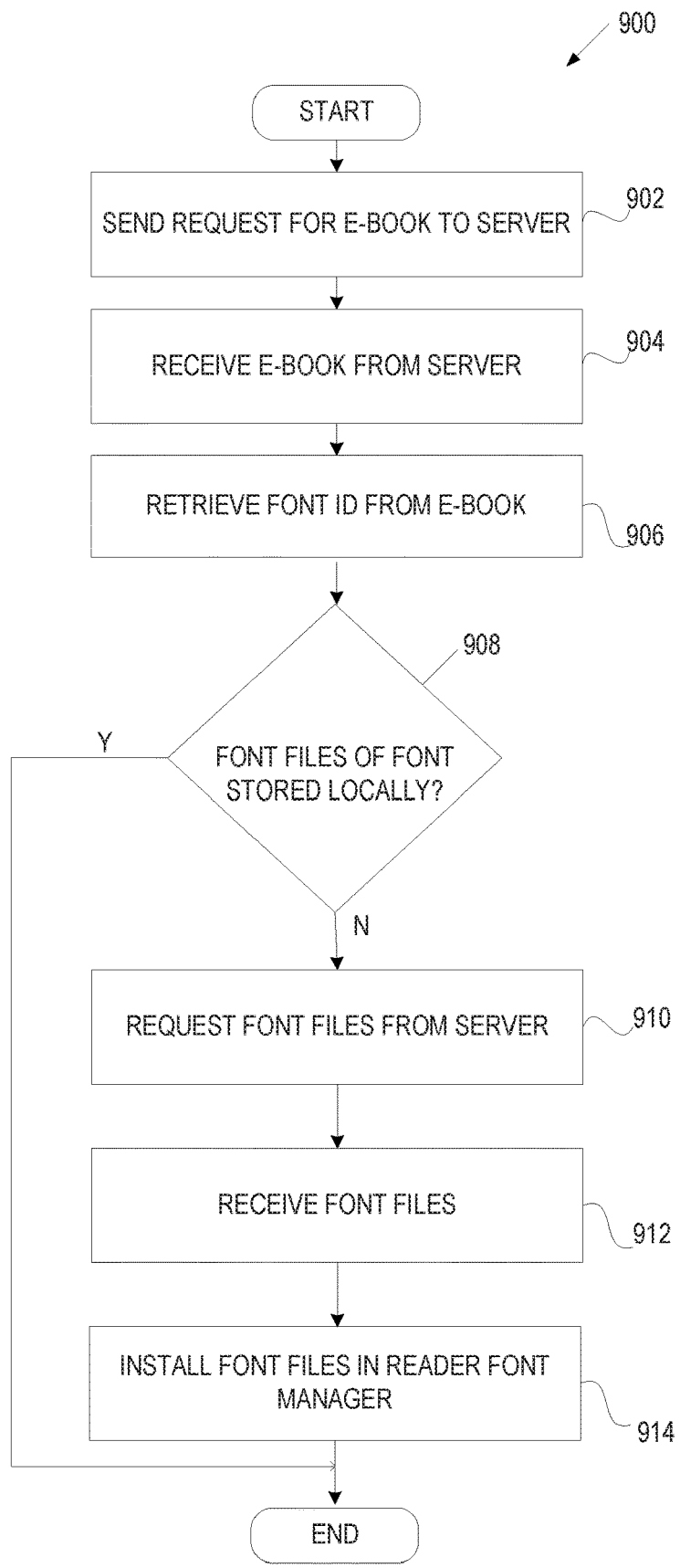
FIG. 9 is a flow diagram of one embodiment of a client-side method for obtaining fonts for an e-book.

FIG. 9 is a flow diagram of one embodiment of a client-side method 900 for obtaining fonts for an e-book. The method is performed by processing logic that may comprise hardware (circuitry, dedicated logic, etc.), software (such as is run on a general purpose computer system or a dedicated machine), or a combination of both. In one embodiment, the method is performed by a user device (e.g., font agent 212 of FIG. 2).

Referring to FIG. 9, method 900 begins with the user device sending a request for an e-book to a server (block 902). At block 904, the user device receives the e-book from the server (block 904). At block 906, the user device retrieves from the e-book a font ID of a font associated with the e-book.

At block 908, the user device determines whether font files of the font are stored locally. If so, method 900 ends. If not, the user device requests the font files from the server using the font ID (block 910), receives the font files from the server (block 912), and provides the font files to the Reader font manager for installation (block 914). The Reader font manager can be a utility provided by the operating system of the user device to install and manage fonts on the user device.

Figure 10:
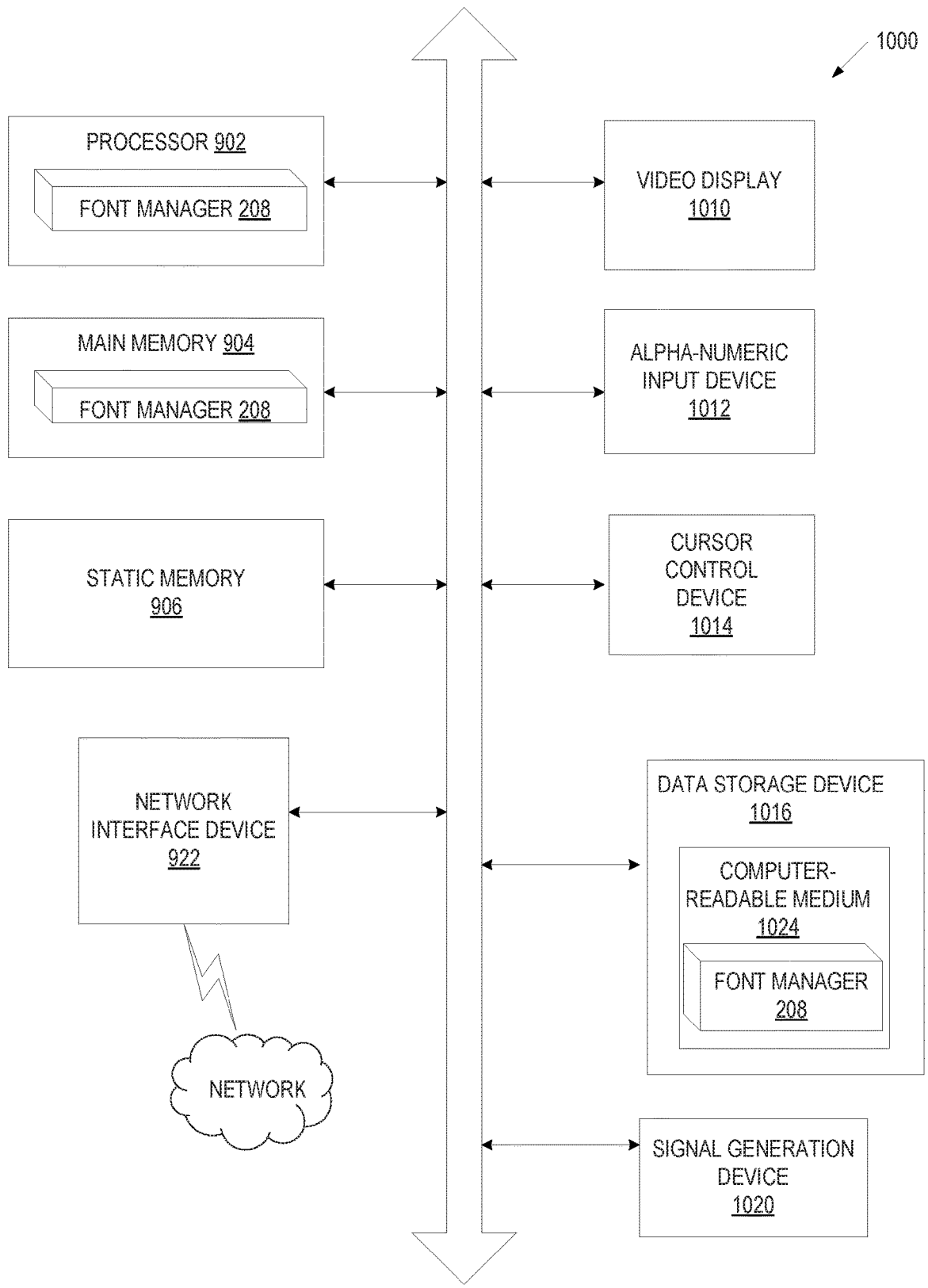
FIG. 10 illustrates an example server implementing a font manager.

FIG. 10 illustrates an example server in the form of a computer system 1000 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing system (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1006.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions of the font manager 208 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

A drive unit 1016 may include a computer-readable medium 1024 on which is stored one or more sets of instructions (e.g., instructions of the font manager 208) embodying any one or more of the methodologies or functions described herein. The instructions of the font manager 208 may also reside, completely or at least partially, within the main memory 1004 and/or within the processor 1002 during execution thereof by the computer system 1000, the main memory 1004 and the processor 1002 also constituting computer-readable media. The instructions of the font manager 208 may further be transmitted or received over a network via the network interface device 1022.

While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    presenting in a user interface, to an entity associated with an electronic publication, a list comprising a plurality of fonts;
    identifying a selection of a font from the list comprising the plurality of fonts;
    identifying font rendering characteristics associated with a user device type;
    generating, by a processing device, a simulation of the electronic publication rendered in the font by applying the font rendering characteristics;
    adding a font identifier of the font to the electronic publication;
    in response to identifying an upgraded version of the font, replacing the font identifier with an upgraded font identifier corresponding to the upgraded version of the font;
    retrieving, in response to a connection with a user device, font information identifying one or more fonts stored on the user device;
    receiving a request for the electronic publication from the user device;
    retrieving the upgraded font identifier from the electronic publication;
    sending the electronic publication to the user device;
    comparing, by the processing device, the upgraded font identifier and the font information received from the user device to determine that at least one font file associated with the upgraded font identifier of the upgraded version of the font is not stored on the user device; and
    sending, via a network, the at least one font file of the font to the user device.

2. The method of claim 1, further comprising identifying the user device type is associated with the user device.

3. The method of claim 1, wherein the font is associated with metadata identifying a font source and font pricing information.

4. The method of claim 3, further comprising calculating, based on the metadata, a payment to the font source by the entity.

5. The method of claim 1, further comprising storing, in a record associated with the user device, information indicating the sending of the at least one font file associated with the font identifier.

6. A system comprising:
    a memory; and
    a processing device operatively coupled to the memory, the processing device to:
        generate an updatable list comprising a plurality of available fonts;
        receive an electronic publication from an entity associated with the electronic publication;
        receive a selection of a font from the plurality of available fonts;
        identify font rendering characteristics associated with a user device type;
        generate, by the processing device, a simulation of the electronic publication rendered in the font by applying the font rendering characteristics;
        add a font identifier of the font to the electronic publication;
        receive a request for the electronic publication from a user device;
        compare, by the processing device, the font identifier and font information received from the user device to determine that at least one font file associated with the font identifier of the font is not stored on the user device; and
        send, via a network, the at least one font file associated with the font identifier to the user device.

7. The system of claim 6, the processing device to:
    store, in a record associated with the user device, information indicating the at least one font file associated with the font identifier was sent to the user device.

8. The system of claim 6, wherein the font identifier comprises at least one of an identifier of a font source of the font, a font face of the font, or a version of the font.

9. The system of claim 6, the processing device to:
subscribe the entity to receive an update of the font;
receive an updated font version of the font; and
replace, in the electronic publication, the font identifier of the font with an identifier of the updated font version.

10. The system of claim 6, wherein the font is associated with metadata identifying a font source and font pricing information.

11. The system of claim 10, the processing device to:
calculate, based on the metadata, a payment to the font source by the entity.

12. A method comprising:
generating an updatable list comprising a plurality of available fonts;
receiving, via a user interface, a first selection of a font from the plurality of available fonts;
receiving, via the user interface, a second selection of a user device type, wherein the user device type is associated with font rendering characteristics;
generating, by a processing device, a simulation of an electronic publication rendered in the font by applying the font rendering characteristics;
presenting, via the user interface, the simulation of the electronic publication;
receiving, via the user interface, a selection of the font;
adding a font identifier of the font to the electronic publication;
receiving a request for the electronic publication from a user device;
identifying at least one font file of the font based on the font identifier;
determining based on the font identifier and font information received from the user device, that at least one font file associated with the font identifier is not stored on the user device; and
sending, to the user device, the electronic publication and the at least one font file of the font.

13. The method of claim 12, further comprising:
retrieving the font identifier from the electronic publication.

14. The method of claim 12, further comprising:
receiving an updated font version of the font; and
replacing, in the electronic publication, the font identifier of the font with an identifier of the updated font version.

15. The method of claim 12, further comprising:
storing, in a record, metadata identifying a font source and font pricing information associated with the font.

* * * * *